United States Patent
Kikkawa et al.

(10) Patent No.: US 8,340,499 B2
(45) Date of Patent: Dec. 25, 2012

(54) RECORDING CONTROL APPARATUS AND CONTROL METHOD FOR THE SAME

(75) Inventors: Teruki Kikkawa, Machida (JP); Yasushi Shikata, Tama (JP); Tomoya Asanuma, Yokohama (JP); Tomoyasu Yoshikawa, Kawasaki (JP); Osamu Yonishi, Yokohama (JP); Satoshi Hanamitsu, Kawasaki (JP); Koji Mito, Kawasaki (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 12/034,395

(22) Filed: Feb. 20, 2008

(65) Prior Publication Data

US 2008/0205857 A1 Aug. 28, 2008

(30) Foreign Application Priority Data

Feb. 26, 2007 (JP) ................................ 2007-045645

(51) Int. Cl.
*H04N 5/92* (2006.01)
*H04N 9/80* (2006.01)

(52) U.S. Cl. ........ 386/248; 386/216; 386/217; 386/218; 386/219; 386/224; 348/14.01; 725/141; 725/153

(58) Field of Classification Search .......... 386/216–219, 386/224, 248; 348/14.01; 725/141, 153
See application file for complete search history.

(56) References Cited

U.S. PATENT DOCUMENTS

| | | | |
|---|---|---|---|
| 6,931,198 B1 * | 8/2005 | Hamada et al. | 386/234 |
| 2004/0228614 A1 * | 11/2004 | Yokoyama et al. | 386/69 |
| 2004/0246346 A1 * | 12/2004 | Kim et al. | 348/222.1 |
| 2005/0122863 A1 * | 6/2005 | Kudo | 369/47.23 |
| 2005/0265190 A1 * | 12/2005 | Kudo | 369/53.2 |
| 2005/0265195 A1 * | 12/2005 | Koba | 369/53.44 |
| 2006/0018471 A1 * | 1/2006 | Tada | 380/228 |
| 2006/0110127 A1 * | 5/2006 | Iggulden | 386/52 |
| 2006/0114510 A1 * | 6/2006 | Maeng | 358/1.16 |
| 2006/0140576 A1 * | 6/2006 | Oka | 386/46 |
| 2007/0036524 A1 * | 2/2007 | Kawachi | 386/124 |
| 2008/0050098 A1 * | 2/2008 | Okamura et al. | 386/124 |
| 2008/0063380 A1 * | 3/2008 | Sasakura et al. | 386/124 |

FOREIGN PATENT DOCUMENTS

| | | |
|---|---|---|
| CN | 1801744 A | 7/2006 |
| JP | 2001-339696 A | 12/2001 |
| JP | 2006-054022 | 2/2006 |
| JP | 2006-165925 | 6/2006 |
| KR | 10-2005-0118156 A | 12/2005 |
| KR | 10-2006-0095170 A | 8/2006 |

(Continued)

OTHER PUBLICATIONS

Vangala V. Ramana et al, Adaptive write strategy selection mechanism for optical recording systems, pp. 161-167, IEEE, 2006.*

(Continued)

*Primary Examiner* — Philip Chea
*Assistant Examiner* — Shanto M Abedin
(74) *Attorney, Agent, or Firm* — Cowan, Liebowitz & Latman, P.C.

(57) ABSTRACT

To select a recording device for recording a program in a digital television receiver to which a plurality of recorders (recording devices) are connected, control is performed to acquire image quality information about the program to be recorded and to compare the program image quality to be recorded with the recording image quality of a recording medium for each connected recording device. Based on the result of this comparison, a recorder is selected that can secondarily record the program onto a recording medium without compromising the program image quality.

8 Claims, 11 Drawing Sheets

FOREIGN PATENT DOCUMENTS

WO  2004-086370 A  10/2004
WO  2006/126632 A  11/2006

OTHER PUBLICATIONS

The above references were cited in a May 20, 2009 Korean Office Action that issued in Korean Patent Application No. 10-2008-0015233, which is enclosed without English Translation.

The above references were cited in a Nov. 13, 2009 Chinese Office Action which is enclosed with English Translation, that issued in Chinese Patent Application No. 200810008362.X.

The above references were cited in a Aug. 30, 2011 Japanese Office Action, which is enclosed without English Translation, that issued in Japanese Patent Application No. 2007-045645.

* cited by examiner

FIG. 4

| INPUT PORT | Physical Address | DEVICE ATTRIBUTE | Vendor ID | Vendor Specific Data | HDD RECORDING IMAGE QUALITY | MEDIUM RECORDING | SUPPORTED MEDIA | MEDIUM RECORDING IMAGE QUALITY |
|---|---|---|---|---|---|---|---|---|
| INPUT 1 | 1.0.0.0 | Recording Device1 | 0xxx | DEVICE A | HD | Y | DVD | SD |
| INPUT 2 | 2.0.0.0 | Recording Device2 | 0xyy | DEVICE B | HD | Y | BD | HD |

FIG. 7

| INPUT PORT | Physical Address | DEVICE ATTRIBUTE | Vendor ID | Vendor Specific Data | HDD RECORDING IMAGE QUALITY | MEDIUM RECORDING | SUPPORTED MEDIA | MEDIUM RECORDING IMAGE QUALITY | MEDIUM MAXIMUM SUPPORTED CAPACITY |
|---|---|---|---|---|---|---|---|---|---|
| INPUT 1 | 1.0.0.0 | Recording Device1 | 0xxx | DEVICE A | HD | Y | DVD-R DVD-RW | SD | 4.7GB |
| INPUT 2 | 2.0.0.0 | Recording Device2 | 0xyy | DEVICE B | HD | Y | BD | HD | 30GB |
| INPUT 3 | 3.0.0.0 | Recording Device3 | 0xxx | DEVICE C | HD | Y | HD-DVD | HD | 50GB |

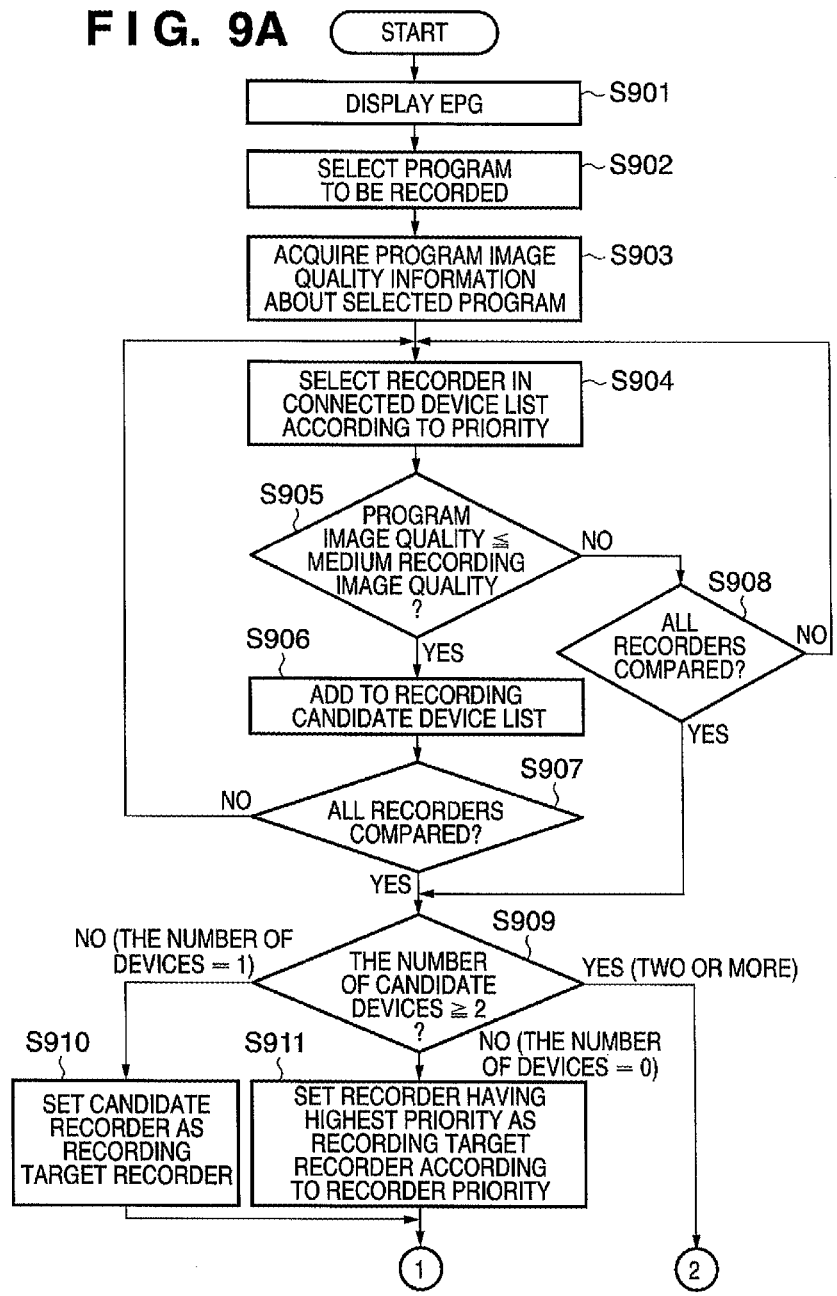

RECORDING CONTROL APPARATUS AND CONTROL METHOD FOR THE SAME

BACKGROUND OF THE INVENTION

1. Field of the Invention

The present invention relates to a recording control apparatus that controls a plurality of recording devices connected thereto, and a control method for the recording control apparatus.

2. Description of the Related Art

Recording devices in recent years have a recording unit that records content onto a recording medium such as a DVD (Digital Versatile Disk), BD (Blu-ray Disk (R)), or HD-DVD (High Definition DVD). Besides this recording unit for such a recording medium, the recording devices typically have an HDD (Hard Disk Drive).

A DVD recorder has an HDD and a DVD recording unit (DVD drive), where content can be recorded onto the HDD with HD (High Definition) image quality. A user can down-convert the content and record it onto a DVD with SD (Standard Definition) image quality.

A BD recorder has an HDD and a BD recording unit (BD drive), where content can be recorded onto the HDD and the BD while HD image quality of the content is maintained.

One of digital interface standards for connecting such recording devices to a digital television receiver is HDMI (High Definition Multimedia Interface).

HDMI is a standard developed based on a digital video transmission technique called TMDS (Transition-Minimized Differential Signaling). HDMI allows operations of connected devices to be controlled with each other by authenticating each other device through DDC (Display Data Channel) and by transmitting commands with CEC (Consumer Electronics Control).

Thus, a user can use HDMI to control recording from a digital television receiver onto a recording device, and to control playback.

With the recent emergence of digital television receivers having a plurality of HDMI connectors, cases are increasing where a digital television receiver is used with a plurality of recording devices connected thereto.

The ability to connect a plurality of recording devices to a digital television receiver provides a user with the freedom to select a recording medium for recording content among a plurality of candidate recording media. On the other hand, a problem is that the user has to select which recording device to use at the time of recording or at the time of scheduling the recording.

For such a problem, several solutions have been presented. Japanese Patent Laid-Open No. 2006-54022 discloses a method of automatically selecting a recording device for recording content where a plurality of recording devices are connected to a digital television receiver. Specifically, user-preset priority of the recording devices and state information about each recording device are used. The state information may include whether or not each recording device is capable of recording, whether or not a recording medium is loaded, whether or not the recording medium is recordable (whether or not it is read-only), and whether or not the recording capacity of the recording medium is larger than the size of a program to be recorded.

Japanese Patent Laid-Open No. 2006-165925 describes a method for a user to preset which recording medium to be used for recording and fixedly select a recording medium where a plurality of recording media that satisfy equal image quality performance are provided in a single recording device.

However, the above Japanese Patent Laid-Open No. 2006-54022 and Japanese Patent Laid-Open No. 2006-165925 are directed to methods of selecting a recording medium optimal for primary recording. Primary recording refers to the action of initially recording video content received via a broadcasting wave or the like. On the other hand, the action of copying or moving the content once recorded in the HDD for primary recording onto a DVD or BD will hereinafter be referred to as secondary recording.

A user often primarily records a program onto the HDD without determining beforehand whether or not the program is to be recorded secondarily. Therefore, it is often the case that, when the program once recorded in the HDD is desired to be recorded and saved in another recording medium, the user finds that the program has been primarily recorded with a recording device that does not allow the image quality or recording medium the user desires.

For example, even when a program the user wants to save has HD image quality, the program must be degraded to SD image quality for secondary recording onto a recording medium if the program has been primarily recorded with a DVD recorder. As another possible case, even though the user has a DVD recorder supporting dual-layer recording and a DVD recorder supporting only single-layer recording, the user may primarily record a program with the DVD recorder supporting only single-layer recording. Then, the amount of data of the program may be larger than the recording capacity of single-layer recording. In this case, the program will be secondarily recorded onto one DVD with a degraded image quality, or the program will be divided and recorded onto two DVDS. However, if the program has an amount of data that can be recorded onto one dual-layer DVD, such inconvenience as the image quality degradation or the divided program can be avoided by primarily recording the program with the DVD recorder supporting dual-layer recording.

The techniques disclosed in the Japanese Patent Laid-Open No. 2006-54022 and Japanese Patent Laid-Open No. 2006-165925 take into account selecting a recording device optimal for primary recording, but does not take into account whether the recording device optimal for primary recording is also suitable for secondary recording. Therefore, the techniques disclosed in the Japanese Patent Laid-Open No. 2006-54022 and Japanese Patent Laid-Open No. 2006-165925 can simply be applied to select an unsuitable recording device for secondary recording when the user desires secondary recording.

SUMMARY OF THE INVENTION

The present invention has been made to solve the above-described problems. It is an object of the present invention to provide a recording control apparatus and a control method for the recording control apparatus, in which a recording device capable of appropriate secondary recording of content can be automatically selected without requiring a user to be aware of the image quality, the recording capacity of recording media, limitations on the recording media, and so on.

To accomplish the above object, a recording control apparatus according to the present invention is a recording control apparatus that provides a recording instruction to at least any one of a plurality of recording devices to record content onto a recording unit provided in at least one recording device, the plurality of recording devices being connected to the recording control apparatus to allow transmission and reception of information, the apparatus includes: a management unit configured to manage attribute information including at least information about a recording image quality of a recording medium recordable with each recording device; an acquisition unit configured to acquire image quality information about content to be recorded with at least any one recording device; and a selection unit configured to select a recording device for recording the content based on the image quality information about the content and the information about the recording image quality of the recording medium.

To accomplish the above object, a recording control apparatus according to the present invention is a recording control apparatus that provides a recording instruction to at least any one of a plurality of recording devices to record content onto a recording unit provided in at least one recording device, the plurality of recording devices being connected to the recording control apparatus to allow transmission and reception of information, the apparatus includes: a management unit configured to manage attribute information including at least information about a recording medium recordable with each recording device; an acquisition unit configured to acquire limitation information applied when content to be recorded with at least any one recording device is recorded onto a recording medium; and a selection unit configured to select a recording device for recording the content based on the limitation information about the content and the information about the recording medium.

To accomplish the above object, a control method for a recording control apparatus according to the present invention is a control method for a recording control apparatus that provides a recording instruction to at least any one of a plurality of recording devices to record content onto a recording unit provided in at least one recording device, the plurality of recording devices being connected to the recording control apparatus to allow transmission and reception of information, the method includes: a management step of managing, in a storage unit, attribute information including at least information about a recording image quality of a recording medium recordable with each recording device; an acquisition step of acquiring image quality information about content to be recorded with at least any one recording device; and a selection step of selecting a recording device for recording the content based on the image quality information about the content and the information about the recording image quality of the recording medium.

To accomplish the above object, a control method for a recording control apparatus according to the present invention is a control method for a recording control apparatus that provides a recording instruction to at least any one of a plurality of recording devices to record content onto a recording unit provided in the at least one recording device, the plurality of recording devices being connected to the recording control apparatus to allow transmission and reception of information, the method includes: a management step of managing, in a storage unit, attribute information including at least information about a recording medium recordable with each recording device; an acquisition step of acquiring limitation information applied when content to be recorded with at least any one recording device is recorded onto a recording medium; and a selection step of selecting a recording device for recording the content based on the limitation information about the content and the information about the recording medium.

As described above, according to the present invention, a recording device capable of appropriate secondary recording of content can be automatically selected without requiring a user to be aware of the image quality, the recording capacity of recording media, limitations on the recording media, and so on.

Further features of the present invention will become apparent from the following description of exemplary embodiments (with reference to the attached drawings).

BRIEF DESCRIPTION OF THE DRAWINGS

FIG. 4 is a diagram illustrating a connected device list in a first embodiment of the present invention;

FIG. 7 is a diagram showing the overview of the connected device list in a second embodiment of the present invention;

FIGS. 9A and 9B are diagrams showing a processing flow for selecting a recording device in the second embodiment of the present invention.

DESCRIPTION OF THE EMBODIMENTS

First Embodiment

With reference to the drawings, embodiments of the present invention will be described in detail below by way of example. However, unless otherwise specified, there is no intention to limit the scope of the present invention to the functions, shapes, relative positions, and so on of components described in the embodiments. In the following description, initially described functions, shapes, and so on of configurations and parts apply throughout the description unless otherwise specified.

Figure 1:
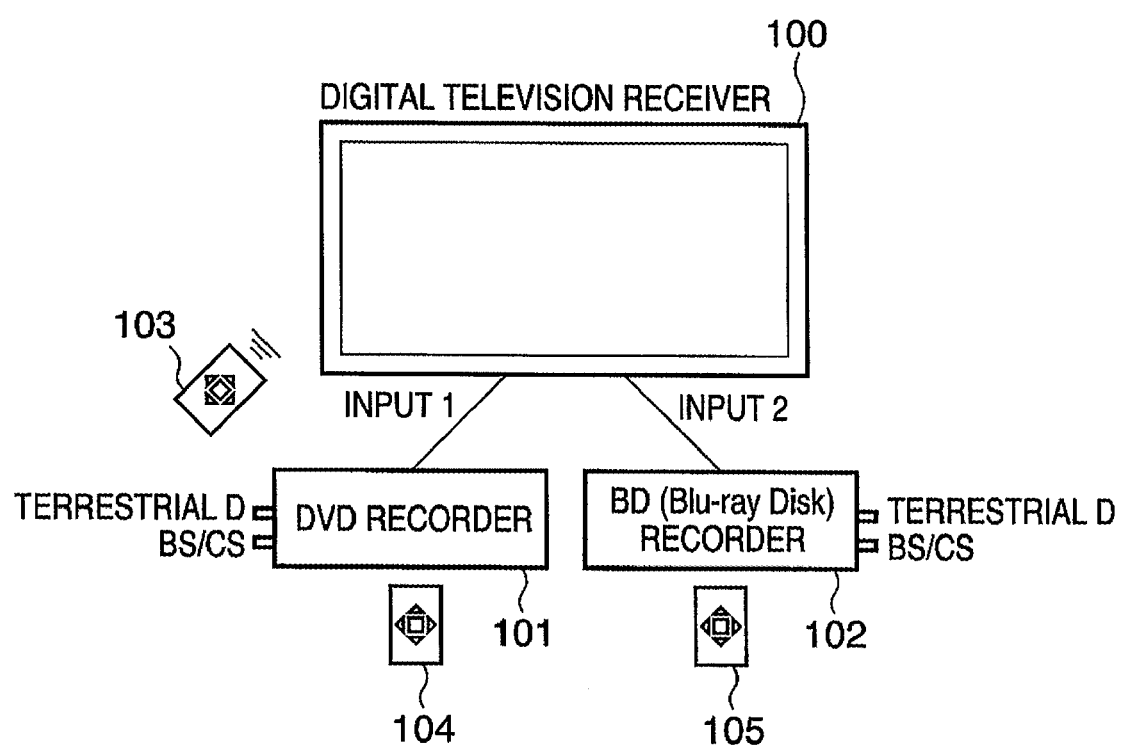
FIG. 1 is a diagram showing a system configuration comprised of a digital television receiver to which the present invention can be applied and recording devices.

FIG. 1 is a diagram showing a system configuration of a digital television receiver to which the present invention can be applied and recording devices. The digital television receiver corresponds to a recording control apparatus of the present invention. However, the recording control apparatus of the present invention is not limited to the digital television receiver but may be any form of apparatus that can perform control of the digital television receiver to be described later. A DVD recorder and a BD recorder correspond to recording devices of the present invention. It is to be understood that the recording devices are not limited to these recorders.

Along with the digital television receiver 100, FIG. 1 shows the DVD recorder 101, the BD recorder 102, and remote controls (103, 104, and 105 in FIG. 1) for the respective devices.

The DVD recorder 101 is a recording device in which video content (e.g., a program) recorded in an HDD serving as a recording unit can be secondarily recorded onto a DVD with SD image quality. The BD recorder 102 is a recording device in which video content recorded in an HDD serving as a recording unit can be secondarily recorded onto a BD with HD image quality.

The digital television receiver 100 and each of the DVD recorder 101 and BD recorder 102 are connected via a digital interface in compliance with the HDMI standard. The receiver and each recorder can control each other via HDMI.

In FIG. 1, the relationship between the digital television receiver 100 and each recorder corresponds to that between Sink and Source in the HDMI standard. That is, the digital television receiver 100 is a Sink device, and each recorder connected to the digital television receiver 100 is a Source device.

Once each recorder as the Source device is connected to the Sink device, the recorder uses DDC to read EDID (Extended Display Identification Data) held in the Sink. EDID is display device information in compliance with the EDID standard established by VESA and stored in a data format defined in EIA/CEA-861B. For example, this data may include video information, such as the resolution displayable by a digital television receiver and the aspect ratio, as well as audio information, manufacturer information, and product information. Based on EDID, each recorder outputs video and audio signals suitable for the digital television receiver 100.

The digital television receiver 100 as the Sink device can use DDC to acquire information about the connected recorders, such as address information and vendor information. The digital television receiver 100 can also use CEC to instruct each recorder on information acquisition and operation control. Besides basic control commands for controlling operations of connected devices, CEC also allows extension by a vendor's own control commands.

In the embodiments of the present invention, it is assumed that a user can use the remote control 103 of the digital television receiver 100 to control recording operations and playback operations of the connected recorders (101 and 102 in FIG. 1) via the digital television receiver 100. CEC is used for transmission of control commands when the digital television receiver 100 controls each recorder.

Figure 2:
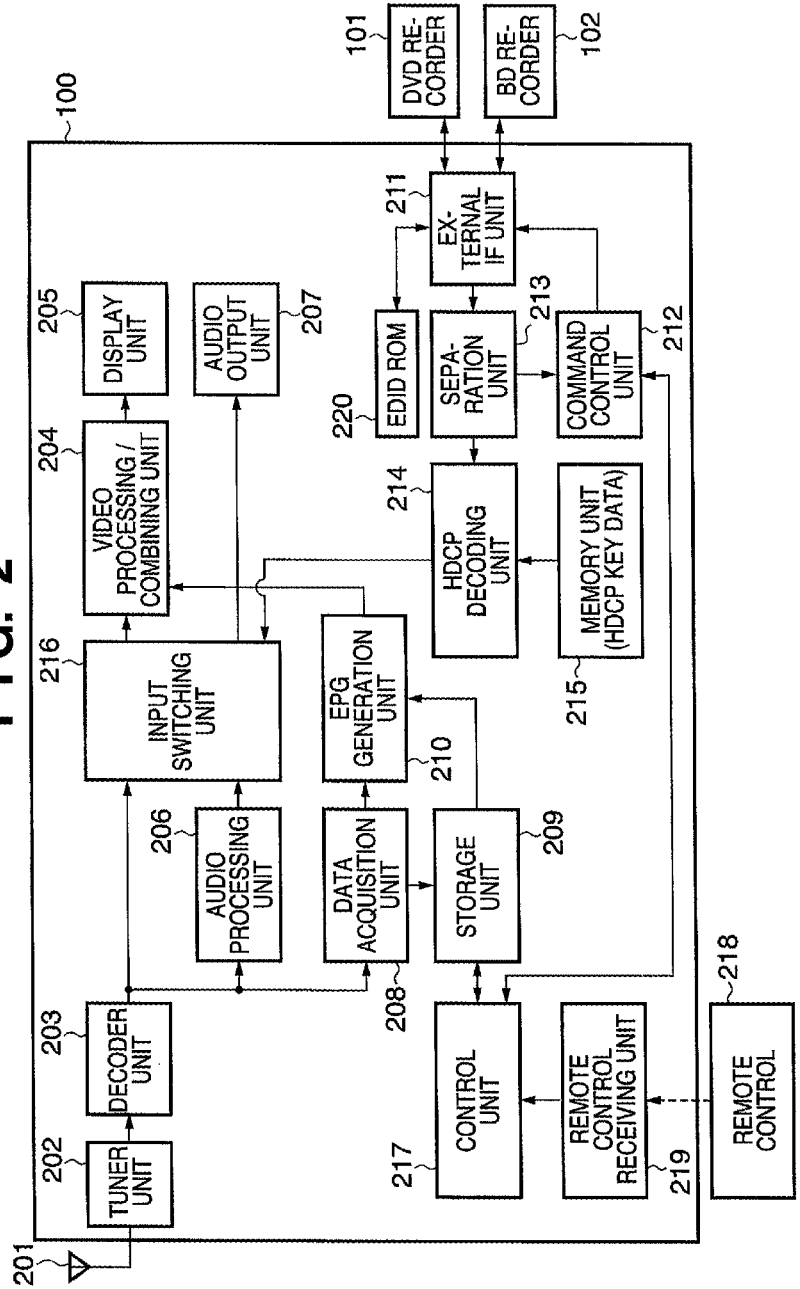
FIG. 2 is a block diagram of the digital television receiver to which the present invention can be applied.

FIG. 2 is a diagram showing an exemplary configuration of the digital television receiver 100. In FIG. 2, a signal received by an antenna 201 is input to a tuner unit 202. The tuner unit 202 processes the input signal for demodulation, error correction and the like, and generates a transport stream (hereinafter referred to as a TS). The tuner unit 202 further outputs the generated TS to a decoder unit 203.

The decoder unit 203 decodes the TS, which is input from the tuner unit 202 and includes time-division-multiplexed data for a plurality of channels, such as video data, audio data, and program information data. Specifically, the decoder unit 203 extracts from the TS the video data, audio data, and program information data for a channel designated via a remote control 218 and a remote control receiving unit 219, and decodes these data items.

In this embodiment, the TS consists of packets, in which a PID (Packet Identifier) for identifying the type (video, audio, or data) is attached to the head of each packet.

A video processing/combining unit 204 combines the video data input from the decoder unit 203 with image data generated by an EPG (Electronic Program Guide) generation unit 210 (to be described later) as necessary and outputs the combined data to a display unit 205. An audio processing unit 206 performs D/A conversion on the audio data input from the decoder unit 203 and outputs the audio data to an input switching unit 216.

In this embodiment, the display unit 205 and the audio output unit 207 are shown to be included in the digital television receiver 100. However, the present invention may adopt a configuration in which these display unit and audio output unit exist outside the receiver 100.

A data acquisition unit 208 acquires desired information from video signal information and program information data that are input from the decoder unit 203, and outputs the information to a storage unit 209. The video signal information includes, for example, information related to the program image quality, the signal format, scanning mode, frame rate, and color space information, written in a sequence header of the video data.

The program information data includes data such as SDT (Service Description Table) and EIT (Event Information Table) according to "Service Information for Digital Broadcasting System", a standard of Association of Radio Industries and Businesses (ARIB STD-B10).

SDT includes information such as a service name corresponding to the broadcast channel, a service provider, and so on. EIT includes information such as an event name corresponding to the program, the starting time and duration of the event, and so on.

An EPG generation unit 210 generates EPG display data by using the program information data input from the data acquisition unit 208 or the storage unit 209. The generated EPG display data is output to the video processing/combining unit 204.

In the embodiments of the present invention, the storage unit 209 is configured to also store a connected device list to be described later. Alternatively, the connected device list may be stored in memory physically separate from the storage unit 209.

An external IF unit 211 is a digital interface in compliance with the HDMI standard and transmits and receives data to/from external devices, for example, recording devices such as the DVD recorder 101 and the BD recorder 102. Specifically, the external IF unit 211 receives input of video data and audio data transmitted from the DVD recorder 101 and the BD recorder 102. The external IF unit 211 also outputs control commands to the DVD recorder 101 and the BD recorder 102 by using CEC. The external devices can read information related to the digital television receiver 100 from an EDID ROM 220.

A command control unit 212 controls generation of the above-mentioned control commands for controlling operations of the external devices, and transmission of the control commands to the external devices via the external IF unit 211.

A separation unit 213 separates video and audio data and commands input from the external IF unit 211. The separation unit 213 outputs the video data and the audio data to an HDCP (High-bandwidth Digital Content Protection System) decoding unit 214 and outputs the commands to the command control unit 212.

The HDCP decoding unit 214 acquires HDCP key data from a memory unit 215 and decodes encrypted video data and audio data. The decoded video data and audio data are output to an input switching unit 216. The input switching unit 216 selects either the video data and audio data input from the decoder unit 203 and the audio processing unit or the video data and audio data of an external device input from the HDCP decoding unit 214, and outputs the selected video data to the video processing/combining unit 204 and the selected audio data to the audio output unit 207.

A control unit 217, shown in FIG. 2 to be connected to the storage unit 209 and the command control unit 212, centrally controls the above-described components.

Figure 3:
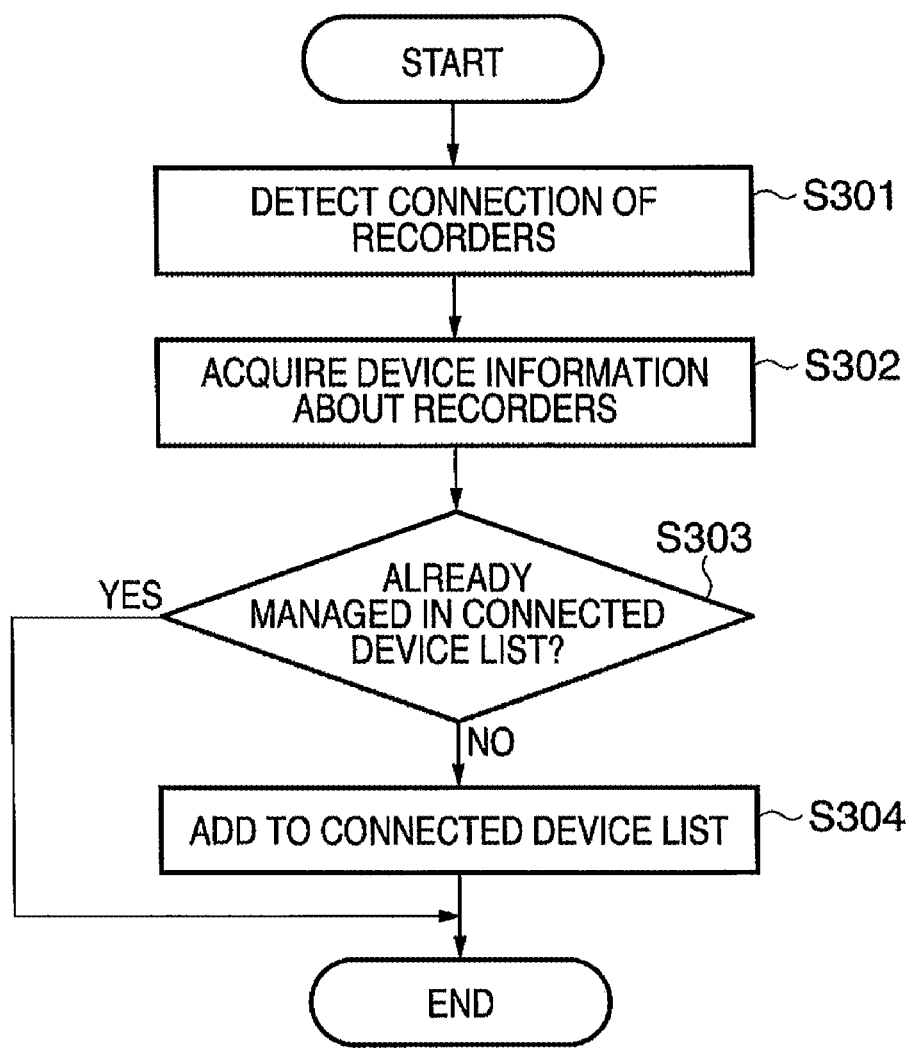
FIG. 3 is a diagram showing a processing flow in which the recording devices are connected to the digital television receiver to which the present invention can be applied.

Now, among processing flows in this embodiment, a processing flow in which the recorders (101, 102) serving as recording devices are connected to the digital television receiver 100 will be described with reference to FIG. 3. This processing flow describes operations of the digital television receiver 100. Each step described below is performed by the control unit 217 of the digital television receiver 100.

First, in step S301, the control unit 217 detects connection of the recorders. Specifically, power is supplied to the external IF unit 211 of the digital television receiver 100 from the recorders connected by HDMI. The external IF unit 211 detects the power supply and returns a command to the recorders indicating connection. In response to this, the recorders read device information about the digital television receiver 100 from the EDID ROM 220. This sequential processing allows the control unit 217 to detect the connection of the recorders.

Next, in step S302, the control unit 217 acquires device information about the recorders for which the connection has been detected. HDMI is standardized so that the physical address, device properties, and manufacturer information can be identified between devices connected with each other. Therefore, once the recorders and the digital television receiver 100 are connected, the digital television receiver 100 can acquire device information about the recorders.

Further, HDMI allows vendor commands of CEC to be uniquely defined. Therefore, vendor commands can be defined to allow the digital television receiver 100 to acquire device information such as information about recording media the recorders support and image quality information about the recording media.

The present invention is not limited by the above-described method of acquiring the device information via HDMI. For example, it is also possible to adopt a method of acquiring the connected device information by causing the user to manually input the device information to the digital television receiver 100.

FIG. 4 shows an example of the connected device list generated based on the device information acquired from the recorders (101, 102 in FIG. 1) connected to the digital television receiver 100. The connected device list is management information for managing various kinds of information about external devices connected to the digital television receiver 100. In this embodiment, since the DVD recorder 101 and the BD recorder 102 serving as recording devices correspond to the connected external devices, various kinds of attribute information about these recorders are managed as the connected device list. As described above, the connected device list is stored in the storage unit 209.

The connected device list will be described. An "Input Port" item corresponds to an input channel of the external IF unit 211 provided in the digital television receiver 100. A "Physical Address" item manages identification information unique to each recorder. A "Device Attribute" item manages the device type differentiated by, for example, the logical address defined by CEC. A "Vendor ID" item manages ID information set for the manufacturer of each device. A "Vendor Specific Data" item manages information such as the product code and the device type name of each device.

An "HDD Recording Image Quality" item manages information about the image quality level at which video signals are recorded onto the HDD provided in each connected device. In the example of FIG. 4, since both the DVD recorder 101 and the BD recorder 102 can record video signals onto the HDD with HD image quality, information indicating HD image quality is managed. That is, in this embodiment, the highest one of recordable image quality levels is managed.

A "Medium Recording" item manages information indicating whether or not each connected device supports recording onto a recording medium. In the example of FIG. 4, since both the DVD recorder 101 and the BD recorder 102 are capable of recording onto a recording medium, that is, DVD and BD respectively, the flag "Y" indicating the recordability is managed in the Medium Recording item.

A "Supported Media" item manages information about the type of recording medium supported by each connected device. A "Medium Recording Image Quality" item manages information about the recording image quality with which content is recorded onto the recording medium of each connected device. In the example of FIG. 4, since the medium supported by the DVD recorder 101 is DVD, information indicating SD image quality is managed as the medium recording image quality. Similarly, since the medium supported by the BD recorder 102 is BD, recording image quality information indicating HD image quality is managed as the medium recording image quality.

In the description of this embodiment, information such as "SD image quality" is directly managed as the medium recording image quality. Alternatively, the present invention is also realized by managing information that allows indirect determination of the medium recording image quality. For example, when information indicating DVD as the supported medium is managed, it is possible to determine that the medium recording image quality is SD image quality because the supported medium is DVD. As long as such determination logic can be implemented in the control unit of the digital television receiver 100, the medium recording image quality need not be directly managed. In the present invention, even information type that allows indirect determination of the medium recording image quality is treated as information about the recording image quality.

While the items of the connected device list in this embodiment has been described above, the present invention is not limited to the described items. For example, other information may be managed, such as information about an audio format supported by each connected device.

Thus, by performing the processing of step S302, the digital television receiver 100 can acquire the information about the connected devices.

Next, in step S303, the control unit 217 determines whether or not the connected devices are already managed in the connected device list. This determination is performed by comparing the device information acquired in step S302 and the connected device list stored in the storage unit 209.

If the control unit 217 determines in step S303 that the devices corresponding to the device information acquired in step S302 are not managed in the connected device list, the control unit 217 transitions to step S304. If the control unit 217 determines in step S303 that the devices corresponding to the device information acquired in step S302 are already registered in the connected device list, the control unit 217 terminates this processing flow.

In step S304, the control unit 217 performs processing of generating the connected device list based on the device information acquired in step S302. If the connected device list already exists, the control unit 217 adds the acquired device information to the connected device list. If the connected device list does not exist, the control unit 217 generates the connected device list itself and writes the acquired device information into the list.

Figure 5:
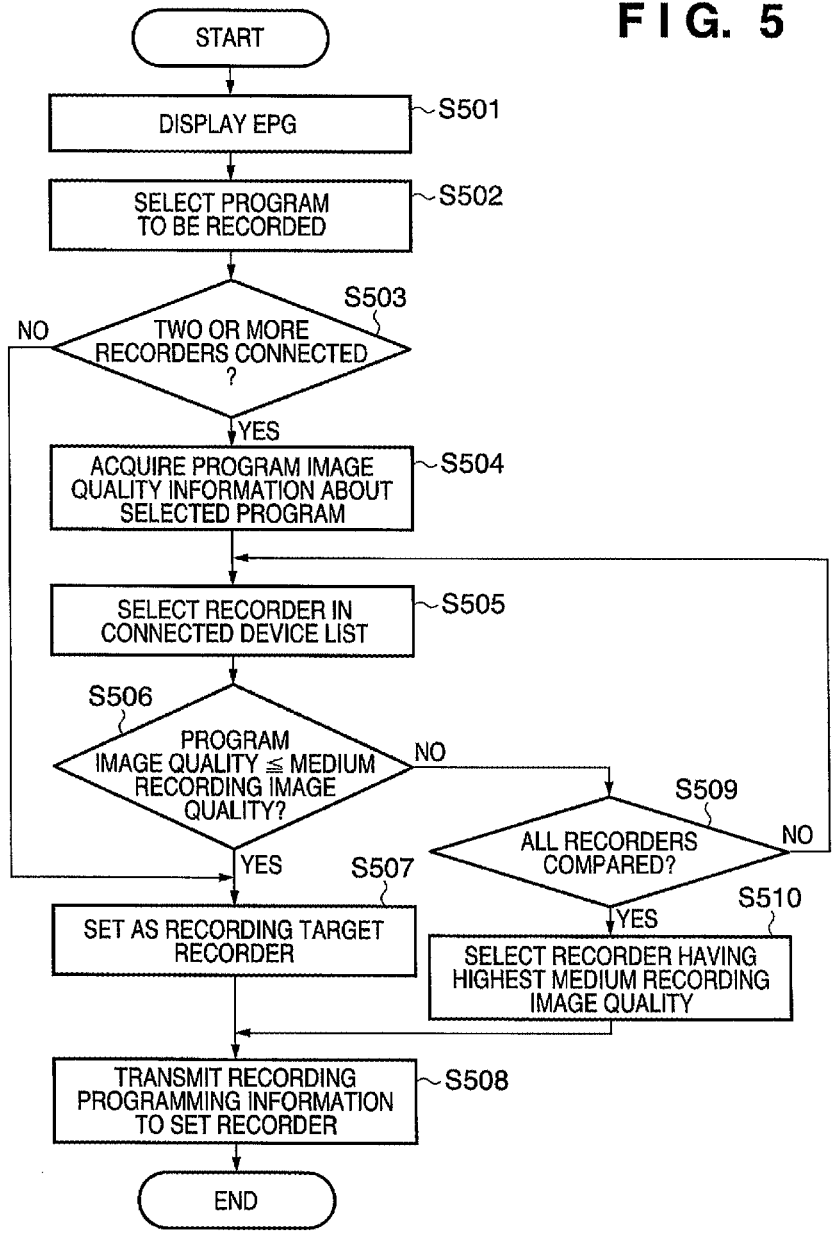
FIG. 5 is a diagram showing a processing flow for selecting a recording device in the first embodiment of the present invention.

Now, description will be given of a processing flow for selecting a recording device for recording video, for example a broadcast program, where a plurality of recording devices are connected to the digital television receiver 100. FIG. 5 showing this processing flow will be referred to in the description below.

In this processing flow, the video content is assumed to be a broadcast program. Therefore, a scene is assumed in which the user gives an instruction to display an EPG and sets recording of the program through the displayed EPG.

First, in step S501, when the user uses the remote control 218 or the like to input an instruction to display the EPG to the digital television receiver 100, the digital television receiver 100 displays the EPG (S501).

Next, in step S502, through the displayed EPG, the user inputs an instruction to select a program to be recorded. In response to this instruction input, the control unit 217 recognizes the program to be recorded.

Next, in step S503, the control unit 217 refers to the connected device list to determine whether or not two or more recording devices (recorders) are connected to the digital television receiver 100. As described above, the connected device list includes the Device Attribute item. The Device Attribute item manages information for identifying whether a connected device is a recording device or a playback-only device, and so on. The control unit 217 can know whether two or more recording devices are connected by acquiring the information managed in the Device Attribute item and by making a determination.

If the control unit 217 determines in step S503 that only one recorder is connected, the control unit 217 proceeds to step S507 to select this recorder as the recording target recorder. While this processing flow omits the case where no recorders are connected, the control unit 217 may determine in step S503 whether or not no recorders are connected. If no recorders are connected, the control unit 217 may terminate the recording processing.

If the control unit 217 determines in step S503 that two or more recorders are connected to the digital television receiver 100, the control unit 217 transitions to step S504.

In step S504, the control unit 217 acquires image quality information about the user-selected program. In the case of broadcasting, image quality information about a program is described by a component descriptor contained in PMT (Program Map Table), EIT (Event Information Table), or the like included in SI (Service Information) transmitted as being multiplexed with a broadcast wave. The component descriptor defines the aspect ratio, resolution (the number of scanning lines), and scanning mode such as interlaced or progressive, of the broadcast program. Therefore, the digital television receiver 100 can acquire image quality information about the user-selected program by acquiring the component descriptor in the data acquisition unit 208 and storing it in the storage unit 209.

Next, in step S505, the control unit 217 refers to the connected device list stored in the storage unit 209 to select one recorder. While two or more recorders are managed in the connected device list, the control unit 217 may select any one recorder.

In step S506, based on the image quality information about the program and the medium recording image quality information about the recorder selected in step S505, the control unit 217 compares these information items. The medium recording image quality information about the recorder selected in step S505 is information stored in the Medium Recording Image Quality item in the connected device list.

The control unit 217 determines whether or not the medium recording image quality of the recorder is equal to the image quality of the program to be recorded, or the medium recording image quality is higher than the program image quality. For example, assume that the image quality information about the selected program includes an aspect ratio of 16:9, 1125 scanning lines, and interlaced scanning mode, and the medium recording image quality of the selected recorder is SD image quality. Since the number of scanning lines for SD image quality is 525, the program with 1125 scanning lines must have its image quality degraded for recording onto the medium. That is, it is determined that the program image quality is higher than the medium recording image quality of the recorder.

Thus, information such as the number of recording pixels (the number of scanning lines) and aspect ratio, determined from the information such as SD or HD managed as the medium recording image quality in the connected device list, is used for the comparison with the image quality information about the program.

If it is determined in step S506 that the medium recording image quality of the selected recorder is equal to the program image quality, or the medium recording image quality is higher than the program image quality, the control unit 217 transitions to step S507. That is, the control unit 217 transitions to step S507 if the medium recording image quality of the selected recorder is equal to or higher than the program image quality.

In step S507, the control unit 217 sets the recorder selected in step S505 as the recording target recorder for this program. That is, the control unit 217 selects the recorder for recording the program among the two or more recorders based on the image quality information about the program and the medium recording image quality information.

Next, in step 508, by using a recording control command according to CEC of HDMI, the control unit 217 transmits to the recorder set in step S507 an instruction to record the user-selected program onto the HDD. Information required for recording is transmitted as the recording instruction, such as the broadcast date, network, service, broadcast time, and broadcast duration.

In this embodiment, the recorder having received the instruction in step S508 records the program onto the HDD (not shown) serving as a recording unit provided in the recorder. That is, the recorder primarily records the broadcast program onto the HDD. Also in the embodiments to be described later, it is assumed that a program to be recorded under the instruction of the digital television receiver 100 is first recorded onto the HDD serving as a recording unit for primary recording. However, while it is assumed that the HDD is used for primary recording in these embodiments, the present invention is not limited to the HDD. Memory such as ROM, or other recording mechanisms, may be used as long as it is a recording unit unintended for output as a recording medium.

If the control unit 217 determines in step S506 that the medium recording image quality of the selected recorder is lower than the program image quality, the control unit 217 transitions to step S509.

In step S509, the control unit 217 determines whether or not the comparison and determination has been finished for all recorders managed in the connected device list. If the comparison has not been finished for all recorders, the control unit 217 returns to step S505 and selects a new recorder from the connected device list. Processing thereafter is similar to that described above.

If the control unit 217 determines in step S509 that the comparison has been finished for all recorders managed in the connected device list, the control unit 217 transitions to step S510.

Transition to step S510 means that none of the connected recorders can record the program onto a medium without degrading the program image quality. Therefore, whichever recorder is selected, the image quality will be degraded when this program is secondarily recorded onto a medium.

Thus, in step S510, the control unit 217 selects a recorder having the highest medium recording image quality among the recorders managed in the connected device list. As described above, even this selected recorder will degrade the image quality in secondary recording. However, the influence of the image quality degradation can be alleviated if the control unit 217 selects a recorder having the highest medium recording image quality.

Once the step S510 is finished, the control unit 217 moves the processing to step S508. Processing in step S508 will not be described because it is similar to that described above.

Thus, as described in this embodiment, to select a recording device for recording a program in the digital television receiver 100 to which a plurality of recording devices are connected, control is performed to compare the image quality of the program to be recorded and the recording image quality of a recording medium for each recording device. Based on the result of this comparison, a recording device for primary recording of the program is selected. In this manner, it is possible to provide a recording control apparatus that can automatically select a recording device capable of optimal secondary recording of content such as a program without requiring a user to be aware of the image quality of the content and the image quality recordable by the recording devices.

This minimizes the problem that, after the user has recorded content such as a program onto the HDD of any recording device and only when the need of secondary recording onto a recording medium arises, the user finds the inconvenience of degradation in the image quality in secondary recording using the selected recording device. Thus, in recording of a program onto the HDD of a recording device (primary recording), applying this embodiment to the recording control apparatus eliminates the need of the user to select a recording device with preliminary consideration of secondary recording unknown to be performed in the future. This enhances the user's convenience.

In this embodiment, the recording device is selected based on the image quality information. Alternatively, in this embodiment and other embodiments to be described later, the recording device may be selected based on sound quality information. For example, control is possible such that if the number of channels of the broadcast program is 5.1 ch, the BD recorder 102 is selected as the recording target recorder.

Further, the image quality information and the sound quality information may be combined to select the recording device. As with the image quality information, the sound quality information about the program may be acquired by referring to information such as an audio component descriptor or quality_indicator of EIT.

The above description does not expressly consider the case where two or more recorders have the same medium recording image quality. If two or more recorders have the same medium recording image quality, various conditions may be used to select one recorder. For example, the various conditions may include a condition that a recorder with larger HDD recording capacity should be selected, and a condition that a recorder frequently used by the user should be selected. Of course, it is also possible to assign priority to each recorder and automatically select a recorder according to the priority. While various methods are possible for selecting one of recorders having the same medium recording image quality, the present invention is not limited thereby but may use any method.

Second Embodiment

Figure 6:
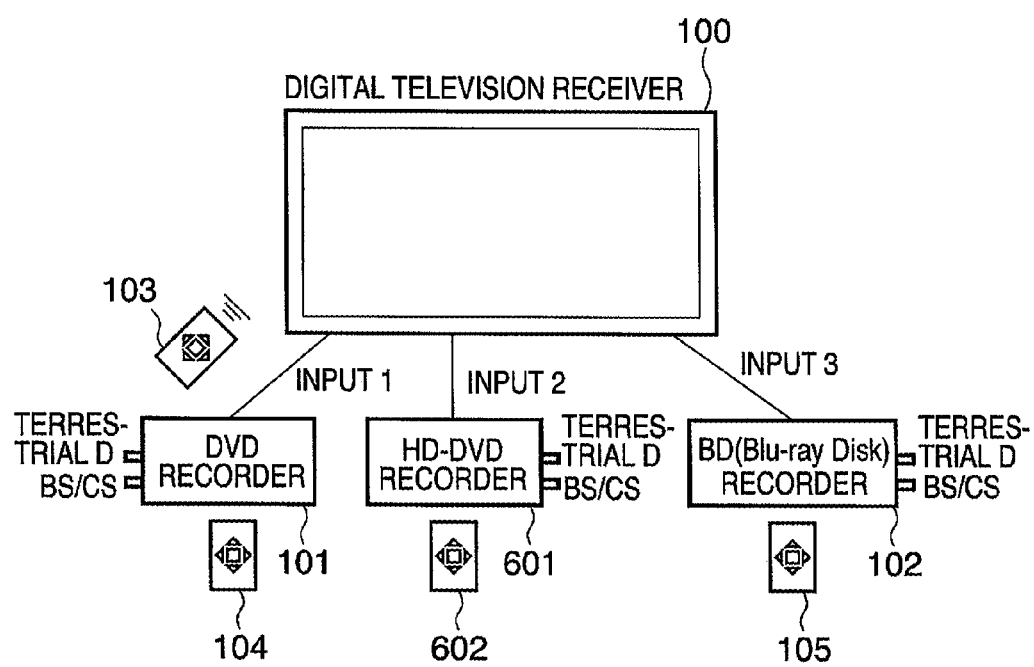
FIG. 6 is a diagram showing a system configuration comprised of the digital television receiver to which the present invention can be applied and recording devices.

Now, a second embodiment of the present invention will be described. The above first embodiment has been described based on the configuration in which the DVD recorder 101 and the BD recorder 102 are connected to the digital television receiver 100. In the second embodiment, an HD-DVD recorder 601 capable of recording video onto an HD-DVD (High Definition DVD) serving as a recording medium is connected to the digital television receiver 100 in addition to the configuration of the first embodiment. This configuration is shown as FIG. 6.

In the second embodiment, when the user (audience) sets recording of a program, the user specifies that a program be eventually recorded onto a recording medium. An optimal recording device is then selected among a plurality of connected recording devices. The second embodiment is characterized by taking the capacity of recording media into consideration during this selection control.

The configuration of the digital television receiver 100 will not be described because it is similar to that described with reference to FIG. 2 in the above first embodiment. However, in the second embodiment, the maximum supported capacity of the recording medium recordable with each connected device is managed in addition to the various items managed in the connected device list in the first embodiment. FIG. 7 shows the connected device list in the second embodiment. The digital television receiver 100 can select an appropriate one of the recording devices by managing in advance the maximum supported capacity of the recording medium recordable with each recording device.

The maximum supported capacity of the recording medium is related to the recording capability of a recording drive provided in a recording device. For example, if a DVD drive provided in a DVD recorder only supports one-sided single-layer recording onto a DVD-R, the maximum supported capacity of the recording medium for the DVD recorder is 4.7 GB. However, if the DVD drive supports one-sided dual-layer recording onto a DVD-R, the maximum supported capacity of the recording medium is 8.5 GB. Thus, the maximum supported capacity of the recording medium in this embodiment corresponds to the recording capacity of a recording medium having the largest capacity recordable with a recording device in question.

The digital television receiver 100 acquires this maximum supported capacity from the connected devices. As in the first embodiment, the vendor's own command in CEC of HDMI may be used for the acquisition. It is to be understood that other acquisition methods may be used. As described in the first embodiment, other means such as user input may also be used. Even without being directly acquired, the maximum supported capacity may be indirectly recognized by knowing the recording medium supported by each recording drive. What is important is that the digital television receiver 100 manages, in some form, information corresponding to the maximum supported capacity of the recording medium recordable with each recording device.

In the connected device list shown in FIG. 7, a "Medium Maximum Supported Capacity" item manages the recording capacity of a recording medium having the largest capacity recordable with each connected device (recorder) as a numeric value. However, the present invention does not necessarily require managing this information as a numeric value.

Now, with reference to FIG. 8, a setting screen displayed in the digital television receiver 100 will be described. This setting screen is for setting the priority, which will be a condition in selecting a connected recorder in the digital television receiver 100. This setting screen is preferably displayed when a new recorder is connected to the digital television receiver 100. However, the present invention is not limited by display timing.

Figure 8:
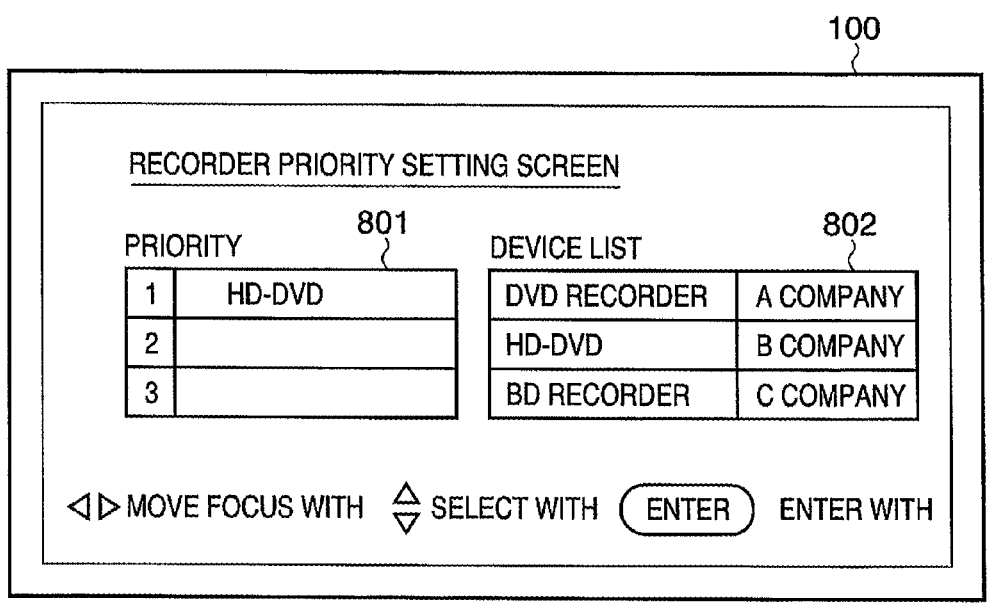
FIG. 8 is a diagram showing an example of a priority setting screen in the second embodiment of the present invention.

FIG. 8 shows an example of the priority setting screen displayed on a display screen of the digital television receiver 100. Priority setting fields 801 include items in which the priority of the recorders selected for recording a program are displayed and set. A device list 802 includes items in which a list of the recorders connected to the digital television receiver 100 is displayed.

The user operates the priority setting fields 801 and the device list 802 with right and left keys provided on the remote control 103. For example, the user selects an item for the second priority in the priority setting fields 801 and then selects a recorder (here, the DVD recorder) that the user wants to give the second priority from the device list 802. The user presses an enter key provided on the remote control 103. In this manner, the DVD recorder is set in the second priority field in the priority setting fields 801. The priority set in the priority setting screen shown in FIG. 8 is managed in a Priority item (not shown) provided in the connected device list.

Figure 9B:
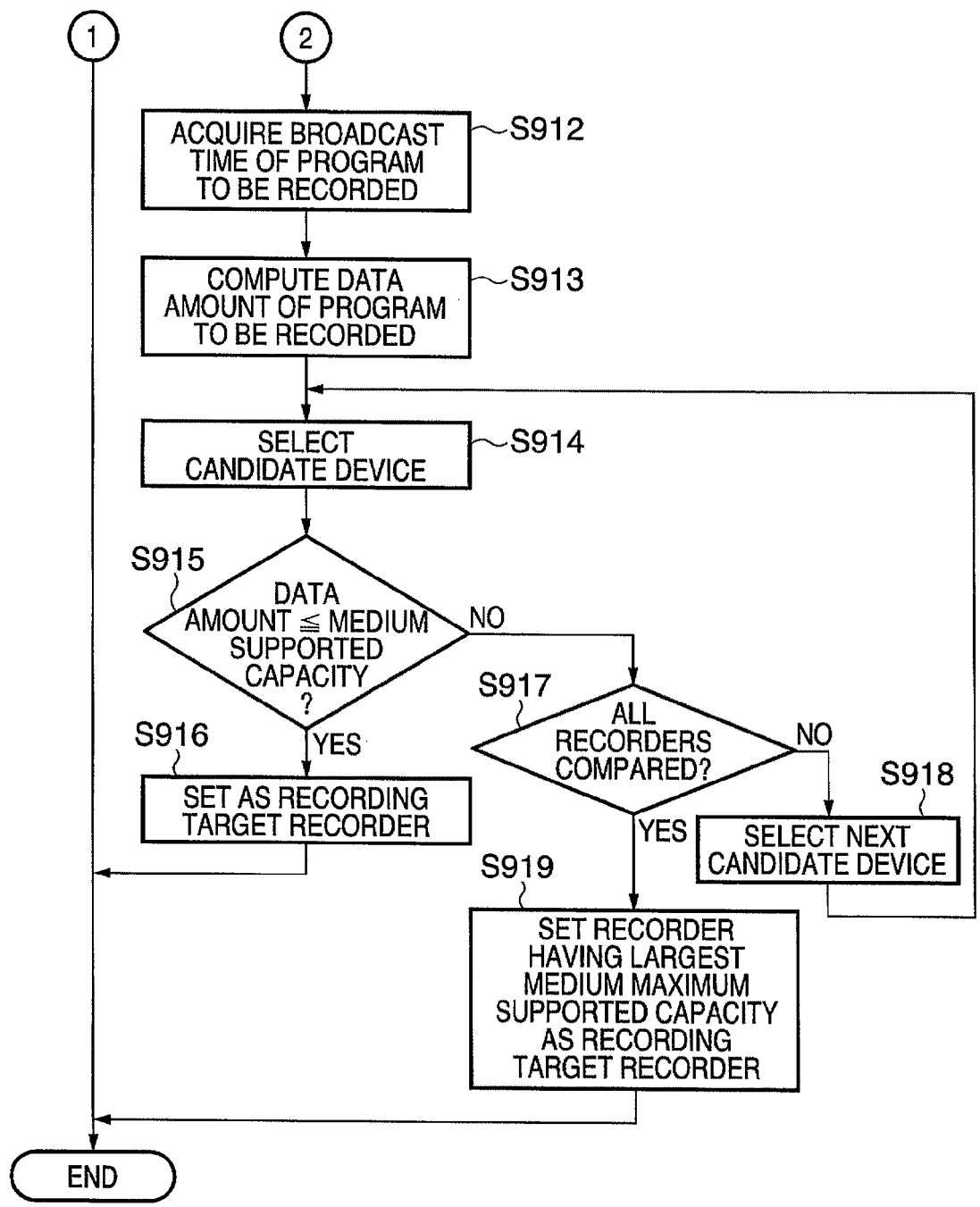

Now, with reference to FIGS. 9A and 9B, a procedure for selecting a recording target recorder in this embodiment will be described. Each step described below is performed by the control unit 217 of the digital television receiver 100.

Steps S901 to S902 will not be described because processing performed therein is similar to that in steps S501 to S502 in the above-described first embodiment. Step S903 will not be described because processing performed therein is similar to that in step S504 in the above-described first embodiment.

While this embodiment does not include the processing of step S503 in the first embodiment, the step of checking whether or not two or more recorders are connected may be performed before step S903.

In step S904, the control unit 217 selects a recorder included in the connected device list according to the above-described priority. At the initial stage of this processing flow, a recorder having the highest priority is selected. That is, the control unit 217 selects a recorder for recording the program by sequentially comparing the image quality information about the program and the recording image quality information about the recording medium according to the set priority.

Next, in step S905, the control unit 217 performs processing of comparing the medium recording image quality information about the selected recorder and the image quality information about the program acquired in step S903. The medium recording image quality information about the recorder selected in step S904 is information stored in the Medium Recording Image Quality item in the connected device list. The control unit 217 determines whether or not the medium recording image quality of the recorder is equal to the image quality of the program to be recorded, or the medium recording image quality is higher than the program image quality. This determination will not be described in detail because it is similar to the determination processing described in step S506 in the first embodiment.

If the control unit 217 determines in step S905 that the medium recording image quality of the selected recorder is equal to the image quality of the program to be recorded, or the medium recording image quality is higher than the program image quality, the processing transitions to step S906. That is, the processing transitions to step S906 if the medium recording image quality of the selected recorder is equal to or higher than the program image quality.

In step S906, the control unit 217 adds the recorder to be compared to a recording candidate device list. The recording candidate device list provides information for managing candidate devices for recording the program the user wants to record in this embodiment. The recording candidate device list may be managed as data separate from the connected device list. Alternatively, it may be managed as an item in the connected device list in such a manner that information identifying a recorder in question as a recording candidate is set for that recorder.

Next, in step S907, the control unit 217 determines whether or not the comparison processing in step S905 has been finished for all recorders managed in the connected device list. If the comparison processing has been finished for all recorders, the control unit 217 moves the processing to step S909. If the comparison processing has not been finished for all recorders, the control unit 217 moves the processing to step S904. In step S904, the control unit 217 selects a recorder given the next priority and continues the processing from step S904.

If it is determined in step S905 that the medium recording image quality of the selected recorder is lower than the program image quality, the control unit 217 moves the processing to step S908. In step S908, the control unit 217 determines whether or not the comparison processing in step S905 has been finished for all recorders managed in the connected device list. If the comparison processing has not been finished for all recorders, the control unit 217 moves the processing to step S904. If it is determined that the comparison processing has been finished for all recorders, the control unit 217 moves the processing to step S909.

In step S909, the control unit 217 determines whether or not two or more recorders have been set as candidates in the sequential processing up to this point. That is, the control unit 217 determines the number of recorders managed in the above-described recording candidate device list.

If it is determined in step S909 that only one recorder is set as the candidate, the control unit 217 moves the processing to step S910.

Transition to step S910 means that only one of the connected recorders is capable of secondary recording without degrading the program image quality. Therefore, in step S910, the control unit 217 sets the one candidate recorder as the recording target recorder for the program the user wants to record.

If it is determined in step S909 that no recorders are set as candidates, the control unit 217 moves the processing to step S911.

Transition to step S911 means that none of the connected recorders is capable of secondary recording without degrading the program image quality. Therefore, in step S911, according to the user-set priority, the control unit 217 sets a recorder having the highest priority as the recording target recorder for the program the user wants to record.

If it is determined in step S909 that two or more recorders are set as candidates, the control unit 217 moves the processing to step S912.

In step S912, the control unit 217 acquires the broadcast time of the program the user wants to record. The broadcast time of the program can be acquired by referring to the program information data stored in the storage unit 209.

Next, in step S913, the control unit 217 computes the amount of data of the program the user wants to record. The amount of data of the program can be computed using the image quality information about the program acquired in step S903, the broadcast time of the program, and so on. For this computation of the amount of data of the program, it is assumed here that the coding mode is MPEG-2 video coding, and the same bit rate is used irrespective of recording media. However, the coding mode, bit rate, and frame size may be processed as appropriate.

Next, in step S914, the control unit 217 selects one of the recorders managed in the recording candidate device list. The recorder is preferably selected in order of the set priority.

In step S915, the control unit 217 compares the amount of data of the program computed in step S913 and the medium maximum supported capacity of the recorder selected in step S914. As described above, the medium maximum supported capacity is information managed in the connected device list. If the control unit 217 determines that the data amount of the program is equal to the medium maximum supported capacity of the selected recorder, or the medium maximum supported capacity is larger than the amount of data of the program, the control unit 217 transitions to step S916. That is, the control unit 217 makes a determination for selecting a recorder capable of recording onto a recording medium having a maximum supported capacity (recordable capacity) equal to or larger than the amount of data of the program.

In step S916, the control unit 217 sets the selected recorder as the target recorder to be used by the user for recording the program. That is, the recorder selected in step S916 is a recorder that can record the program onto one recording medium without degrading the program image quality when the user secondarily records the recorded program onto a recording medium.

If it is determined in step S915 that the amount of data of the program is larger than the medium maximum supported capacity of the selected recorder, it means that this recorder is incapable of secondary recording unless the program image quality is degraded or two or more recording media are used. The control unit 217 then transitions to step S917 to determine whether or not the comparison has been finished for all recording candidate recorders.

If the control unit 217 determines in step S917 that the comparison has not been finished for all recorders, the control unit 217 transitions to step S918 to select another candidate recorder and repeat the same processing from step S914.

If the control unit 217 determines in step S917 that the comparison has been finished for all recorders, the control unit 217 transitions to step S919. In step S919, the control unit 217 sets a recorder having the largest medium maximum supported capacity as the recording target recorder among the recorders set as candidate devices. This is because degradation in the image quality can be minimized when the program recorded in the HDD is secondarily recorded onto a recording medium and the user desires to store the program in one recording medium even at the expense of degradation in the program image quality.

Although not shown, the processing of step S508 described in the first embodiment will be performed after steps S910, S911, S916, and S919.

Further, processing may be performed such as displaying a message prompting the user to acknowledge recording of the program with the recorder finally determined as the recording target recorder.

Thus, as described in this embodiment, to select a recording device for recording a program in the digital television receiver 100 to which a plurality of recording devices are connected, control is performed to compare the image quality of the program to be recorded and the recording image quality of a recording medium for each recording device. If this comparison indicates that two or more recording devices are connected that are capable of recording onto a recording medium without degrading the program image quality, the amount of data of the program is computed. The amount of data is compared with the maximum capacity of a recording medium supported by each recording device. Based on the result of this comparison, one recording device optimal for recording the program can be selected. That is, it is possible to provide a recording control apparatus that can automatically select a recording device capable of secondary recording of content such as a program with an optimal image quality without requiring a user to be aware of the image quality, the data amount, and the image quality recordable by the recording devices.

This minimizes the problem that, after the user has recorded content such as a program onto the HDD of any recording device (primary recording) and only when the need of secondary recording onto a recording medium arises, the user finds the inconvenience of degradation in the image quality in secondary recording using the selected recording device. Further, the problem can be minimized that the user finds the inconvenience of inability to record the program onto one recording medium without degrading the image quality. Thus, in recording of a program onto the HDD of a recording device as primary recording, applying this embodiment to the recording control apparatus eliminates the need of the user to select a recording device with preliminary consideration of secondary recording unknown to be performed in the future. This enhances the user's convenience.

Third Embodiment

Now, a third embodiment of the present invention will be described. As in the above-described second embodiment, it is assumed in this embodiment that at least the BD recorder 102 and the HD-DVD recorder 601 are connected to the digital television receiver 100.

While HD-DVD and BD are both standards capable of recording video with HD image quality, there is currently no compatibility between these standards. Some content holders producing or holding video content such as movies only support either one of the HD-DVD and BD standards.

Therefore, when content held by a content holder that only supports the BD standard is broadcast, secondary recording of the content onto a recording medium may involve situations such as where the recording medium is limited to a BD, or where recording onto an HD-DVD is permitted on condition that the image quality is degraded.

This embodiment will be described about the method of selecting an optimal one of a plurality of recorders when conditioned content recordable onto only a particular recording medium is recorded with a recorder.

First, the mechanism of limiting the recording onto a recording medium will be described. As an exemplary way of limiting the recording, this embodiment uses a digital copy control descriptor defined in "Service Information for Digital Broadcasting System" (ARIB STD-B10).

The digital copy control descriptor represents copy control information for a recording device and so on. The digital copy control descriptor is used by a broadcaster (copyright holder) that broadcasts digitally recordable content for providing a recording device with information about recording and copying of the content. The recording device is requested to control recording and copying of the content according to the details described in the digital copy control descriptor.

The digital copy control descriptor includes a broadcaster definition area in which a broadcaster can define its own limitations. In this embodiment, information for limiting the recording medium is defined in this broadcaster definition area to provide the recording device with the information. Possible information provided through the broadcaster definition area may be information indicating recordability onto only an HD-DVD, information indicating recordability onto only a BD, or the like. Other possible information may be information indicating recordability onto a different recording medium on condition that the image quality is degraded. Such information will hereinafter be referred to as limitation information.

To define the limitation information, a copyright protection mode may be utilized. The HD-DVD medium and the BD (Blu-ray Disk) medium use different copyright protection modes. The HD-DVD medium adopts AACS (Advanced Access Content System). The BD adopts its own protection mechanisms called ROM-Mark and BD+ (BD plus) in addition to AACS.

Therefore, for content recordable onto only recording media supporting only AACS, a bit string such as "00" is defined as the limitation information in the digital copy control descriptor. For content recordable onto only recording media supporting AACS and BD+, a bit string such as "01" is defined as the limitation information in the digital copy control descriptor.

For example, the limitation information indicating recordability onto only a BD medium may be defined in the broadcaster definition area in the digital copy control descriptor for content the user wants to record. In this case, the content can be recorded onto the HDD of the HD-DVD recorder, but secondary recording of the content onto an HD-DVD still with HD image quality is not allowed according to the above information.

Therefore, appropriately selecting a recorder capable of secondary recording at the point when the user records the content onto the HDD leads to the improvement of the user's convenience.

For this purpose, the digital television receiver 100 needs to know in advance, from the connected recording devices (recorders), information about the recording medium type recordable with each recorder. For example, the information managed in the "Supported Media" item in the connected device list shown as FIG. 4 in the first embodiment is exactly the information about the recording medium type. The information about the copyright protection mode acquired from each recorder also serves as the information about the recording medium type. In the present invention, the information about the recording medium type recordable with each recorder may be acquired in any manner. It is assumed in the description in this embodiment that the information about the recording medium type includes the information about the copyright protection mode.

Figure 10:
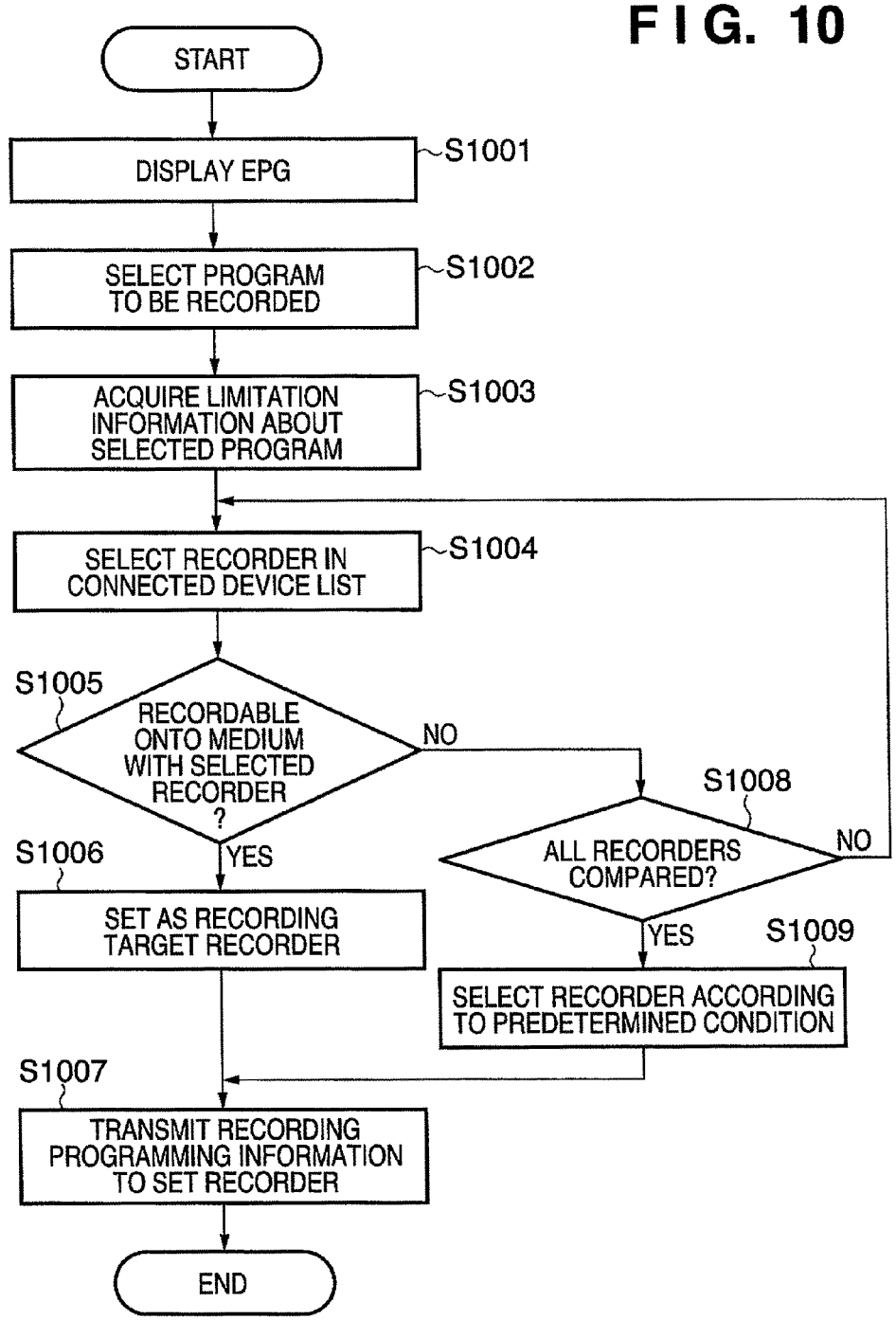
FIG. 10 is a diagram showing a processing flow for selecting a recording device in a third embodiment of the present invention.

Now, with reference to FIG. 10, a procedure for selecting a recording target recorder in this embodiment will be described. Each step described below is performed by the control unit 217 of the digital television receiver 100.

Steps S1001 and S1002 will not be described because processing therein is similar to that in steps S501 and S502 in the above-described first embodiment.

In step S1003, the control unit 217 acquires the limitation information about the user-selected program. The limitation information can be acquired by referring to the digital copy control descriptor included in the program information data stored in the storage unit 209.

Next, in step S1004, the control unit 217 selects a recorder connected to the digital television receiver 100 from the connected device list. While any methods may be adopted for selecting one of the recorders in the connected device list, it will be preferable to select one in order of priority as described in the second embodiment.

In step S1005, the control unit 217 compares the limitation information acquired in step S1003 and the information about copyright protection mode of the recorder selected in step S1004. As described above, the information about copyright protection mode of the selected recorder is acquired by referring to information managed in the connected device list or the like.

In step S1005, the control unit 217 determines whether or not the user-selected program (content) can be recorded onto a recording medium with the selected recorder. If the control unit 217 determines that the program can be recorded onto a recording medium, the control unit 217 transitions to step S1006. In step S1006, the control unit 217 sets the selected recorder as the recording target recorder for the program.

Further transitioning to step S1007, the control unit 217 performs processing of transmitting recording programming information to the recording target recorder. According to the recording programming information, the recording target recorder will primarily record the program onto the HDD serving as a storage unit.

If the control unit 217 determines in step S1005 that the user-selected program cannot be recorded onto a recording medium with the selected recorder, the control unit 217 transitions to step S1008. In step S1008, the control unit 217 determines whether or not the comparison has been finished for all recorders managed in the connected device list. If the comparison has not been finished for all recorders, the control unit 217 transitions to step S1004 to select a new recorder and continue the processing. If the control unit 217 determines that the comparison has been finished for all recorders, the control unit 217 transitions to step S1009.

At the point of transition to step S1009, it is determined that no recorders capable of recording the program onto a recording medium are connected. Although there is a limitation on second recording of the program, the program can be recorded onto the HDD. Therefore, the control unit 217 selects one recorder as the recording target recorder. The control unit 217 then transitions to step S1007. Any condition may be used for the control unit 217 to select one recorder in step S1009.

If there are two or more candidate recorders in the above step, an optimal one of the candidate recorders may be selected depending on the image quality information and the amount of data, as described in the second embodiment.

Thus, as described in this embodiment, to select a recording device for recording a program in the digital television receiver 100 to which a plurality of recording devices are connected, control is performed to compare the limitation information for limiting a recording medium to which the program to be recorded can be output and the information about a recording medium for each recording device. Based on the result of this comparison, one recording device optimal for recording the program can be selected. That is, even if the recording medium usable for recording a program is limited to a recording medium of a particular standard, it is possible to provide a recording control apparatus that can automatically select a recording device capable of secondary recording of the program without requiring a user to be aware of the limitation.

This minimizes the problem that, after the user has recorded a program onto the HDD of any recording device (primary recording) and only when the need of secondary recording onto a recording medium arises, the user finds the inconvenience of inability to secondarily record the program with the selected recording device, or inability to record the program onto a recording medium unless the image quality is degraded. Thus, in recording of a program onto the HDD of a recording device, applying this embodiment to the recording control apparatus eliminates the need of the user to select a recording device with preliminary consideration of secondary recording unknown to be performed in the future. This enhances the user's convenience.

Other Embodiments

The above-described embodiments may also be implemented by software using a computer (or a CPU, MPU, or the like) of a system or an apparatus.

Therefore, a computer program itself supplied to the computer to implement the above-described embodiments by the computer also realizes the present invention. That is, the computer program itself for implementing the functions of the above-described embodiments is also included in the present invention.

The computer program for implementing the above-described embodiments may take any form as long as it is readable by the computer. By way of example but not limitation, the computer program may be configured as an object code, a program to be executed by an interpreter, or script data to be supplied to an OS.

The computer program for implementing the above-described embodiments is supplied to the computer via a storage medium or a wired/wireless communication. Storage media for supplying the program include, for example, magnetic storage media such as a flexible disk, hard disk, and magnetic tape, optical/magneto-optical storage media such as an MO, CD, and DVD, and nonvolatile semiconductor memory.

Methods of supplying the computer program using the wired/wireless communication include a method utilizing a server on a computer network. In this case, a data file (program file) that can be the computer program forming the present invention is stored in the server. The program file may be an executable or may be a source code.

The program file is downloaded and supplied to a client computer that accesses this server. In this case, the program file may be divided into segment files, each of which are located in different servers in a distributed manner.

That is, the server apparatus that provides the client computer with the program file for implementing the above-described embodiments is also included in the present invention.

A storage medium that stores the computer program for implementing the above-described embodiments in an encrypted form may be distributed to a user. The user who satisfies a predetermined condition may be supplied with key information for decrypting the encryption and may be allowed to install the decrypted computer program in the user's computer. The key information may be supplied by causing the user to download it from a homepage via, for example, the Internet.

The computer program for implementing the above-described embodiments may utilize functions of an OS already running on the computer.

Furthermore, part of the computer program for implementing the above-described embodiments may be configured as firmware in an expansion board or the like attached to the computer, or may be executed by a CPU privided on the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-045645, filed Feb. 26, 2007, which is hereby incorporated by reference herein in its entirety.

What is claimed is:

1. A recording control apparatus that provides a recording instruction to at least any one of a plurality of recording devices to record content onto a recording unit provided in the at least one recording device, the plurality of recording devices being connected to the recording control apparatus to allow transmission and reception of information between the plurality of recording device and the recording control apparatus, wherein each of the plurality of recording device capable of performing a primary recording for recording content onto the recording unit in response to the recording instruction provided from the recording control apparatus, and a secondary recording for copying or moving the content recorded onto the recording unit by the primary recording to a removable recording medium different from the recording unit, the apparatus comprising:
a reception unit which receives content;
a computation unit configured to compute a data amount of the received content;
a management unit which manages attribute information for each of the plurality of recording devices, the attribute information includes at least information about a recording image quality of a removable recording medium can be used for the secondary recording;
an acquisition unit which acquires image quality information about the content received by the reception unit and to be recorded with at least one of the plurality of recording devices;
a selection unit which selects, from among the plurality of recording devices, a recording device capable of recording the received content onto the removable recording medium in a recording image quality equal to or higher than the image quality of the received content by the secondary recording for performing the primary recording of the content based on the image quality information about the received content and the information about the recording image quality of the recording medium;
an instruction unit which provides a recording instruction to the selected recording device to instruct the selected recording device to perform the primary recording of the received content onto the recording unit provided in the selected recording device without changing the image quality of the received content; and
a CPU which controls operations of the reception unit, the management unit, the acquisition unit, the selection unit, and the instruction unit, wherein
said management unit manages information about a recordable capacity of a removable recording medium can be used for the secondary recording in each of the plurality of recording devices, and
if two or more recording devices, which are capable of recording the received content onto the removable recording medium in a recording image quality equal to or higher than the image quality of the received content by the secondary recording, are connected, said selection unit determines whether or not there is a recording device capable of performing the secondary recording onto a removable recording medium having a recordable capacity equal to or larger than the data amount computed by the computation unit and, if it exists, selects a recording device capable of recording onto a removable recording medium having a recordable capacity equal to or larger than the data amount for performing the primary recording of the received content.

2. A control method for a recording control apparatus that provides a recording instruction to at least any one of a plurality of recording devices to record content onto a recording unit provided in the at least one recording device, the plurality of recording devices being connected to the recording control apparatus to allow transmission and reception of information between the plurality of recording device and the recording control apparatus, wherein each of the plurality of recording device capable of performing a primary recording for recording content onto the recording unit in response to the recording instruction provided from the recording control apparatus, and a secondary recording for copying or moving the content recorded onto the recording unit by the primary recording to a removable recording medium different from the recording unit, the method comprising:

a reception step of receiving content;

a computation step of computing a data amount of the received content;

a management step of managing, in a storage unit, attribute information for each of the plurality of recording devices, the attribute information includes at least information about a recording image quality of a removable recording medium can be used for the secondary recording;

an acquisition step of acquiring image quality information about the content received in the reception unit and to be recorded with at least one of the plurality of recording devices; and a selection step of selecting, from among the plurality of recording devices, a recording device capable of recording the received content onto the removable recording medium in a recording image quality equal to or higher than the image quality of the received content by the secondary recording for performing the primary recording of the content based on the image quality information about the received content and the information about the recording image quality of the recording medium; and an instruction step of providing a recording instruction to the selected recording device to instruct the selected recording device to perform the primary recording of the received content onto the recording unit provided in the selected recording device without changing the image quality of the received content, wherein in said management step, information about a recordable capacity of a removable recording medium can be used for the secondary recording in each of the plurality of recording devices is managed, and if two or more recording devices, which are capable of recording the received content onto the removable recording medium in a recording image quality equal to or higher than the image quality of the received content by the secondary recording, are connected, in said selection step, whether or not there is a recording device capable of performing the secondary recording onto a removable recording medium having a recordable capacity equal to or larger than the data amount computed by the computation unit is determined and, if it exists, a recording device capable of recording onto a removable recording medium having a recordable capacity equal to or larger than the data amount for performing the primary recording of the received content is selected.

3. A control apparatus comprising:

a connection unit that connects with a plurality of recording devices, each of the plurality of recording devices performing a primary recording for recording image data in a storage unit provided in the recording device, and a secondary recording for recording image data recorded in the storage unit by the primary recording to a removable recording medium;

an obtaining unit that obtains attribute information including information relating to an image quality of image data to be recorded on a removable recording medium used for the secondary recording by the recording device, and information relating to a recording capacity of a removable recording medium used for the secondary recording by the recording device;

a designation unit that designates image data to be recorded;

a selection unit that selects, from among the plurality of recording devices, a recording device for recording the designated image data in accordance with an image quality of the image data designated by the designation unit and the attribute information, wherein the selection unit selects, from among the plurality of recording devices, a recording device capable of recording the designated image data on a removable recording medium in an image quality equal to the image quality of the designated image data by the secondary recording, wherein if two or more recording devices, which are capable of recording the designated image data on the removable recording medium in an image quality equal to the image quality of the designated image data by the secondary recording, are connected, the selection unit selects, for recording the designated image data, a recording device capable of performing the secondary recording on a removable recording medium having a larger recording capacity than a data amount of the designated image data;

a CPU that controls the connection unit such that a recording instruction that causes the selected recording device to record the designated image data is outputted to the selected recording device, wherein the designated image data is recorded in the storage unit of the selected recording device by the primary recording in accordance with the recording instruction.

4. The apparatus according to claim 3, wherein the obtaining unit obtains the attribute information from the plurality of recording devices that the connection unit connects with.

5. The apparatus according to claim 3, wherein the designation unit designates a broadcast program as the image data to be recorded, from among a plurality of broadcast programs.

6. The recording apparatus according to claim 3, wherein the plurality of recording devices include a first recording device which performs the secondary recording for recording image data on a digital versatile disc and a second recording device which performs the secondary recording for recording image data on a blu-ray disc, wherein the selection unit selects the second recording device, if the designated image data is high definition image data.

7. The apparatus according to claim 3, wherein the storage unit provided in the recording device includes a hard disk drive.

8. A control method for controlling an apparatus to which a plurality of recording devices are connected, each of the plurality of recording devices performing a primary recording for recording image data in a storage unit provided in the recording device, and a secondary recording for recording image data recorded in the storage unit by the primary recording to a removable recording medium, the method comprising the steps of:

obtaining attribute information including information relating to an image quality of image data to be recorded on a removable recording medium used for the secondary recording by the recording device, and information relating to a recording capacity of a removable recording medium used for the secondary recording by the recording device;

designating image data to be recorded;

selecting, from among the plurality of recording devices, a recording device for recording the designated image data in accordance with an image quality of the designated image data and the attribute information, wherein the step of selecting selects, from among the plurality of recording devices, a recording device capable of recording the designated image data on a removable recording medium in an image quality equal to the image quality of the designated image data by the secondary recording, and wherein if two or more recording devices, which are capable of recording the designated image data on the removable recording medium in an image quality equal to the image quality of the designated image data by the secondary recording, are connected, the step of selecting selects, for recording the designated image data, a recording device capable of performing the secondary recording on a removable recording medium having a larger recording capacity than a data amount of the designated image data; and controlling the apparatus such that a recording instruction that causes the selected recording device to record the designated image data is outputted to the selected recording device, wherein the designated image data is recorded in the storage unit of the selected recording device by the primary recording in accordance with the recording instruction.

* * * * *